Aug. 17, 1948.   J. F. SCHOEPPEL   2,447,212
VARIABLE INDUCTANCE PICK-UP DEVICE
Filed Nov. 13, 1944   2 Sheets-Sheet 1
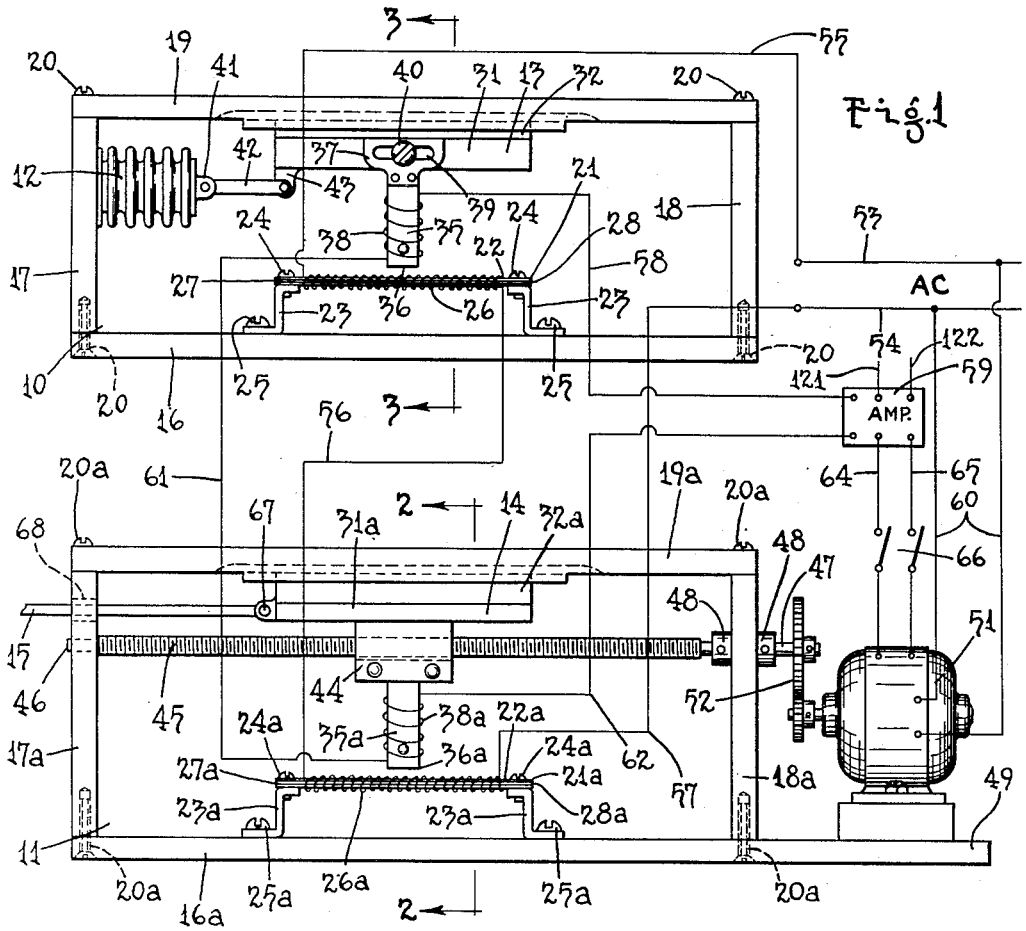
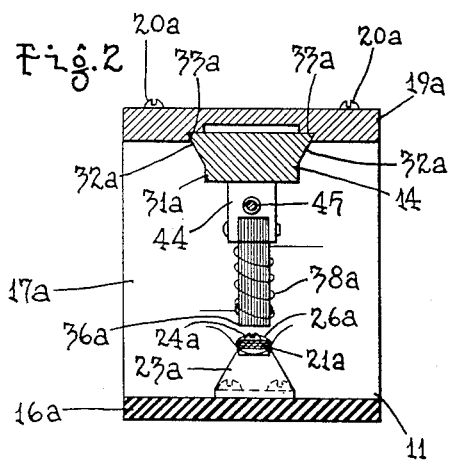
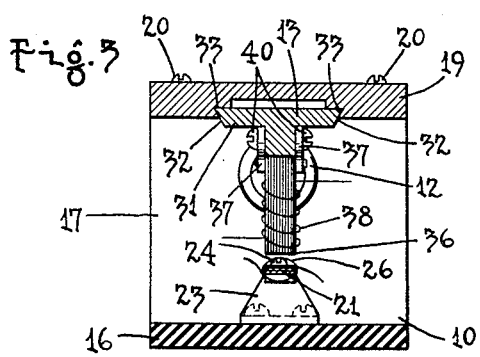
Inventor
John F. Schoeppel
George H. Fisher
Attorney

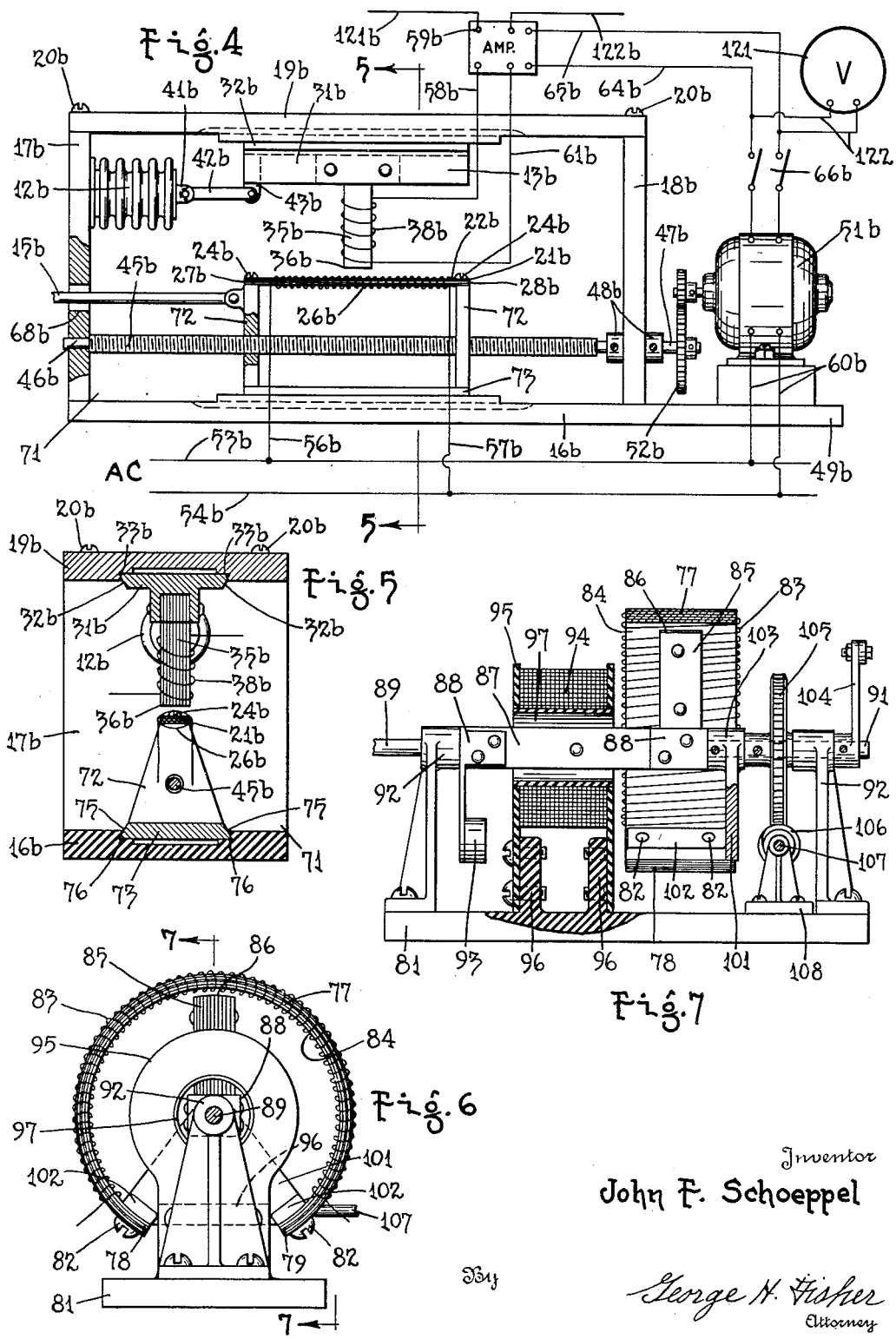

Patented Aug. 17, 1948

2,447,212

UNITED STATES PATENT OFFICE 2,447,212

VARIABLE INDUCTANCE PICKUP DEVICE

John F. Schoeppel, Minneapolis, Minn., assignor to Minneapolis-Honeywell Regulator Company, Minneapolis, Minn., a corporation of Delaware Application November 13, 1944, Serial No. 563,206

10 Claims. (Cl. 171—119(777))

My invention relates to electric control devices and has for an object to provide an electric control device which is simple in construction and sensitive in operation.

Another object of the invention resides in providing a control device which uses a minimum amount of energy.

An object of the invention resides in providing a control device which changes phase in the output circuit when the movable element of the same is moved to either side of its neutral position.

Another object of the invention resides in providing a control device in which the phase angle of the output voltage remains substantially constant throughout the operation of the device.

A still further object of the invention resides in providing a control device in which the voltage set up in the movable member is substantially proportional to the extent of movement thereof.

Another object of the invention resides in providing an electric control device which operates by the emanation of stray flux laterally from an elongated core member.

A still further object of the invention resides in providing a device having a minimum amount of resistance to the movement of the movable member or back torque in the event of the pivoting of the movable member.

Other objects of the invention reside in the novel combination and arrangement of parts and in the details of construction hereinafter illustrated and/or described.

In the drawings:

Fig. 1 is a diagrammatic view of a control system illustrating an embodiment of my invention.

Fig. 2 is an elevational sectional view taken on line 2—2 of Fig. 1.

Fig. 3 is an elevational sectional view taken on line 3—3 of Fig. 1.

Fig. 4 is a diagrammatic view illustrating the use of my invention in connection with another form of electric control system.

Fig. 5 is a cross-sectional view taken on line 5—5 of Fig. 4.

Fig. 6 is an end view of a control device illustrating a modification of my invention.

Fig. 7 is a cross-sectional view taken on line 7—7 of Fig. 6.

In the control system shown in Fig. 1, two control devices 10 and 11 are employed which are similar in construction. The control device 10 is actuated by means of a temperature responsive device 12 and has a movable member 13 moved in accordance with the movement of said temperature responsive device. The control device 11 is remotely situated from the device 10 and has a movable member 14 which is moved in correspondence with the movement of the movable member of the control device 10 and which, in turn, moves an operating member 15 adapted to move any particular device or mechanism to be controlled by the thermally responsive member 12, as for example, a damper or valve of a heating system or other device which might be controlled by the thermally responsive member 12. These various parts and the circuits in which the same are connected will now be described in detail.

The control device 10 comprises a base 16 which has attached to it at its ends uprights 17 and 18. A longitudinally extending frame member 19 is connected to the uprights 17 and parallels the base 16. These parts may be secured together in any suitable manner as by means of screws 20.

Mounted on the base 16 is an elongated core member 21 rectangular in cross-section and of a width considerably greater than its thickness. This core member is provided with an upwardly extending face 22 and has free ends 27 and 28. The core member 21 is preferably constructed of laminations which are parallel to the face 22. The core member 21 is attached to two Z-shaped brackets 23, by means of screws 24. The brackets 23 are bolted to the base 16 by means of bolts 25.

Wound on the core member 21 is a distributed winding 26 which extends throughout the length of the same. The core 21 is relatively wide and thin in cross section and the winding 26 is so designed that when the same is energized, an appreciable amount of stray flux is emitted from the face 22 of the core member 21. This stray flux is greatest in the vicinity of the ends 27 and 28, and becomes less towards some locality of the core member intermediate the ends thereof which I have termed the null point. When the core member and winding are symmetrical, the null point becomes the geometric center of the core member.

The movable member 13 consists of a support 31 which is formed at its upper edge with dovetailed gibs 32 movable along corresponding dovetailed guideways 33 formed in the frame member 19. By means of this construction, the movable member 13 is mounted for sliding movement parallel to the face 22 of the core member 21.

Attached to the support 31 is a second core member 35 which is secured thereto by means of two plates 37 riveted to said core member. These plates overlie the support 31 which at the locality of attachment of the core member 35 thereto is of the same thickness as the said core member. Said plates are provided with slots 39 parallel with the face 22 of the core member 21. Screws 40 extend through said slots and are threaded into the support 31 and hold the core member 35 in adjusted position on the support 31. This core member is substantially rectangular in form and may be of substantially square cross-section if desired. Said core member is so arranged that one end 36 thereof is moved along the face 22 of the core member 21 and the portion of the winding 26 overlying said face. Mounted on the core member 35 is a winding 38, preferably with many turns of fine wire, which is adapted to be energized by the stray flux from the core member 21 passing through the core member 35.

The thermally responsive member 12 has been illustrated as a bellows which is filled with a suitable fluid. This bellows is shown attached to the upright 17 and the movable end of the same has formed on it a lug 41. Pivoted to the lug 41 is a link 42 which, in turn, is pivoted to a lug 43 formed on the support 31 of the movable member 13. It will thus become readily comprehended that as the bellows of the thermally responsive member 12 expands and contracts, the movable member 13 is moved in accordance therewith and in accordance with the temperature affecting the thermally responsive member 12.

The control device 11 is similar to the control device 10 and for such reason, the description of the same will not be repeated, but the same reference numerals, to which have been added the reference character $a$, will be used to indicate corresponding parts. The movable member 14 of the control device 11 has a portion 44 which is threaded to receive an elongated screw 45. The axis of this screw is parallel to the guides 33$a$ in which the movable member 14 travels. This screw has reduced ends 46 and 47 which are journaled in bearings formed in the uprights 17$a$ and 18$a$. Collars 48, attached to the end 47 of the screw 45, restrain longitudinal movement of the screw. The base 16$a$ of the control device 11 has an extension 49 on which is mounted an electric motor 51. This motor drives through a suitable gear reduction 52 the screw 45. It can readily be comprehended that the gear reduction 52 is illustrated diagrammatically and that the same may consist of as many gears of the desired type as will become necessary to give the screw 45 the desired reduction in speed. The motor 51 may be of the shaded pole reversible type, such as disclosed in Patent No. 2,255,601, issued September 9, 1941, to H. M. Schmitt, and operates in opposite directions, depending upon the phase of the current energizing the same. The operating member 15 may be pivoted or otherwise connected as at 67 to the support 31$a$ of the movable member 14. In the form of the invention illustrated in Fig. 1, this operating member extends through an opening 68 in the upright 17$a$.

Energy is supplied for operating the control devices of my invention by means of a line AC having conductors 53 and 54. One end of the winding 26 is connected by means of a conductor 55 with the conductor 53 of the line AC. The other end of this winding is connected by means of a conductor 56 with the opposite end of the winding 26$a$ of the control device 11. The other end of the winding 26$a$ is connected by means of a conductor 57 with the conductor 54 of line AC. When the windings 26 and 26$a$ are energized, flux passes through the core members 35 and 35$a$ and sets up voltage in the windings 38 and 38$a$. These voltages are amplified by an amplifier 59. Inasmuch as amplifiers are well known in the art, the same is shown diagrammatically, though it can be comprehended that any suitable form of amplifying device may be used. The amplifier 59 has connected to it conductors 121 and 122 for energizing the same and which may be connected to the line AC or any other suitable source of energy. One end of the winding 38 is connected by means of a conductor 58 with the input side of the amplifier 59. The other end of this winding is connected by means of a conductor 61 with the winding 38$a$ of the control device 11. The other end of the winding 38$a$ is connected by means of a conductor 62 with the input of the amplifier 59. The output of the amplifier 59 is connected by means of conductors 64 and 65 with the motor 51. A switch 66, associated with the conductors 64 and 65, serves to manually connect or disconnect the motor 51 from the system. The motor 51 is connected by means of conductors 60 with the line AC.

The operation of the invention is as follows: The core member 35 is first adjusted relative to the support 31, so that when the thermally responsive member 12 is at a position corresponding to some certain predetermined temperature, the core member 35 is at the null point of the device. In such position, the stray fluxes flowing through the core member 35 are equal and opposite and no voltage is induced in the winding 38. The control device 11 is similarly adjusted. If the temperature should change, the bellows of the thermally responsive member 12 would expand or contract, moving the movable member 13 to one side or the other of the null point. Such movement would cause a portion of the stray flux from the core member 21 to pass through the core member 35 and produce a voltage in the winding 38. This voltage would have a phase which would depend upon to which side of the null point the core member 35 was moved. The said voltage would be impressed upon the amplifier 59 and the output thereof would cause the motor 51 to operate in a particular direction. Energization of the motor 51 would operate the screw 45 and move the movable member 14 in accordance with the movement of the movable member 13. As the movable member 14 passed the null point, a voltage would be induced in the winding 38$a$ which would be opposed to the voltage in the winding 38. After the movable member 14 had moved the same amount as the movable member 13, the voltages would exactly balance each other and the input to the amplifier 59 would be reduced to zero. The motor 51 would then cease to operate. During movement of the movable member 14, the operating member 15 connected thereto would open or close the valve, damper or other device to be controlled by the control system. Any other movement of the movable member 13 would result in a corresponding movement of the movable member 14, so that the control device would always occupy a position determined by the controlling member which, in this case, would be the thermally responsive member 12.

In the form of the invention shown in Figs. 1-3, the control device is assumed to be remotely positioned from the actuating device. For example, when the thermally responsive member is situated in a room of a building and the other device consists of a damper or valve situated at the heating plant disposed in another room of the building. Where the control device and the actuating member are closely situated, the invention may be greatly simplified by using the construction shown in Figs. 4 and 5. In this figure, I have shown a control device 71. This control device is similar to those shown in Fig. 1 and the description thereof will not be repeated. The similar parts will be designated by the same reference numerals used in Fig. 1 and to which the suffix *b* has been added. The movable member 13*b* of the control device 71 is identical with and operates in the same manner as the movable member 13 of the control device 10 of Fig. 1. Instead of having the operating member 15*b* operated by a separate control device, the core member 21*b* is made movable and said operating member connected thereto. For this purpose, the core member 21*b* is mounted on uprights 72 secured to a sliding support 73. This support has gibs 75 which travel along guideways 76 formed in the base 16*b*. The uprights 72 are threaded to receive a screw 45*b* which is similar to the screw 45 used in connection with the movable member 14 of the control device 11. This screw is operated in exactly the same manner as the screw 45 by motor 51*b*. In this form of the invention, the winding 38*b* is connected by conductors 58*b* and 61*b* directly to the input side of the amplifier 59*b*. Also, the distributed winding 26*b* is connected by means of conductors 56*b* and 57*b* to the conductors 53*b* and 54*b* of the line AC.

For the purpose of indicating the amount of off balance of the system produced by any movement of the bellows 12*b*, a voltmeter 121 is employed which is connected to the conductors 64*b* and 65*b* by means of conductors 122.

The operation of this form of the invention is similar to that previously described. When the thermally responsive member 12*b* moves the movable member 13*b* from the null point of the device, a voltage is induced in the winding 38*b* which, through the amplifier 59*b*, sets the motor 51*b* in operation. Screw 45*b* is now rotated until the core member 21 has been moved to bring the null point thereof at the center of the movable core member 35*b*. The motor then stops and the operating member 15*b* remains in its adjusted position until the thermally responsive member 12*b* causes the same to again change.

While I have shown the sliding parts of the control devices mounted in gibs and guideways, it can readily be comprehended that any suitable guide means may be used for supporting the same for movement. Where I have shown the core members adjustable relative to their supports, it can also be comprehended that adjustment can also be made elsewhere and the core members rigidly secured to their supports.

In Figs. 6 and 7, I have shown a modification of the invention in which a minimum resistance to the movement of the movable member occurs and in which flexible leads on the movable member are dispensed with. In this form of the invention, an elongated core member 77 is employed which is constructed arcuate in form. The ends 78 and 79 of this core member form the poles thereof and are supported in a manner to be presently described in detail. This core member is laminated, the same as the core member 21 and may be of the same relative proportions.

The core member 77 has a distributed winding 83 which encircles the said core member and extends throughout the extent thereof. This winding corresponds to the winding 26 of the core member 21. The said core member 77 has an arcuate face 84 which is disposed upon the interior surface of the same.

Operating in conjunction with the core member 77 is a second core member 85 which corresponds to the core member 35. This core member has an end 86 which is adapted to travel along the face 84 of the core member 77 and the winding 83 wound thereon. The core member 85 has connected to it a leg 87 which forms a portion of the said core member and which extends axially of the core member 77. This leg has attached to it clips 88 which have issuing outwardly therefrom trunnions 89 and 91 which are journaled for swinging movement in bearings 92 attached to a base 81. A counterweight 93, secured to the leg 87 extends in a direction opposite to the core member 85 and counterbalances the same, so that the said core member may rotate freely on its trunnions 89 and 91 and unaffected by gravity, remain in any adjusted position.

Encircling the leg 87 of core member 85 is a winding 94 which is wound on a spool 95. The spool 95 is attached to two lugs 96 on the base 81 and is formed with a bore 97 through which the leg 87 freely extends. By means of this construction, the leg 87 travels freely within the winding 94 without contacting the same or the supporting structure therefor.

The core member 77 is attached to a mounting 101 which has issuing outwardly from it two lugs 102, disposed adjacent the ends 78 and 79 of the said core member. Screws 82 extend through said core member and are threaded into the lugs 102. The mounting 101 is provided with a bearing 103 which is journaled for rotation on the trunnion 91, as best shown in Fig. 7.

The core member 77 is coaxially arranged with reference to the axis of the trunnions 89 and 91, so that a substantially constant air gap is formed between the end 86 of core member 85 and the face 84 of the core member 77, regardless which of the said core members is moved.

The operation and manner of using the device shown in Figs. 6 and 7 is similar to that previously described. Instead if using a screw for adjusting the parts of the device shown in Figs. 6 and 7, a lever 104 is attached to the trunnion 91 by means of which the actuating or sensing device may impart rotational movement to the core member 85. The bearing 103 of the mounting 101 supporting the core member 77 has mounted on it a worm wheel 105. This worm wheel meshes with a worm 106 on a shaft 107 which is journaled for rotation in one or more bearings 108 mounted on the base 81. This worm and worm wheel take the place of the screw shown in the other form of the invention. It will readily be comprehended that the core member 85 may be rotated independently of the core member 77, so that no flexible leads are connected therewith. Since the force available for operating the rotatable member consisting of the core member 85 may be extremely small, it follows that a minimum of resistance is encountered. Where two control devices are employed, as disclosed in Fig. 1, the core member 77 becomes stationary. In such case, no flexible leads are required for the invention.

The advantages of my invention are manifest. The device can be made relatively small and compact and occupies a minimum amount of space. The invention adapts itself for use either with a translatory movable member or a rotatable movable member. Since the invention depends for operation upon stray flux, the amount of energization utilized is exceedingly small and the phase shift is reduced to a minimum. The width of the elongated core member may, if desired, be varied along the extent thereof, so that the amount of flux emanating from the core may be modified throughout the length of the elongated core member. The same may also be accomplished by changing the thickness of the elongated core member. In this manner, it is possible to procure a voltage at the output coil which varies proportionately to the length or angle of movement of the movable member or which may bear any other desirable relation thereto within certain limits. In the rotary type of my invention, the movable member operates with a minimum amount of friction and flexible leads are dispensed with when separate devices are used. The device may be used in any of the control systems now employing similar construction.

Changes in the specific form of my invention, as herein described, may be made within the scope of what is claimed without departing from the spirit of my invention.

Having described my invention, what I claim as new and desire to protect by Letters Patent is:

1. An electric control device comprising an elongated noncontinuous core member, a distributed input winding extending along said core member and adapted upon energization to produce a sufficiently high flux density in said core member to cause stray flux to emanate laterally from said core member varying in degree from the ends of said core member to a locality intermediate its ends, a second core member extending transversely of said first core member and having a portion movable along said distributed winding, and an output winding mounted on said second core member and energized by the stray flux passing through said second core member.

2. An electric control device comprising an elongated noncontinuous core member, said core member being of substantially rectangular cross section and having a width greater than its thickness to provide a relatively wide face extending along said core member, a distributed input winding extending along said core member and adapted upon energization to produce a sufficiently high flux density in said core member to cause stray flux to emanate laterally from said face of said core member varying in degree from the ends of said core member to a locality intermediate its ends, a second core member extending transversely of said first core member and having a portion opposite said face of said first named core member and movable along said distributed winding, and an output winding mounted on said second core member and energized by the stray flux passing through said second core member.

3. An electric control device comprising an elongated noncontinuous core member, said core member having a face extending along said core member and of a width greater than the maximum thickness of said core member, a distributed input winding extending along said core member and adapted upon energization to produce a sufficiently high flux density in said core member to cause stray flux to emanate laterally from said face of said core member varying in degree from the ends of said core member to a locality intermediate its ends, a second core member extending transversely of said first core member and having a portion opposite said face of said first named core member movable along said distributed winding and an output winding mounted on said second core member and energized by the stray flux passing through said second core member.

4. An electric control device comprising an elongated noncontinuous core member, said core member being substantially rectangular in cross section and of a width not less than eight times its thickness to provide a relatively wide face extending along said core member, a distributed input winding extending along said core member and adapted upon energization to produce a sufficiently high flux density in said core member to cause stray flux to emanate laterally from said face of said core member varying in degree from the ends of said core member to a locality intermediate its ends, a second core member extending transversely of said first core member and having a portion opposite said face of said first named core member movable along said distributed winding and an output winding mounted on said second core member and energized by the stray flux passing through said second core member.

5. An electric control device comprising an elongated noncontinuous core member, said core member being of substantially rectangular cross section and having a width greater than its thickness to provide a relatively wide face extending along said core member, said core member being constructed of laminations arranged parallel to said face, a distributed input winding extending along said core member and adapted upon energization to produce a sufficiently high flux density in said core member to cause stray flux to emanate laterally from said face of said core member varying in degree from the ends of said core member to a locality intermediate its ends, a second core member extending transversely of said first core member and having a portion opposite said face of said first named core member movable along said distributed winding and an output winding mounted on said second core member and energized by the stray flux passing through said second core member.

6. An electric control device comprising an elongated noncontinuous core member, said core member being arranged in the form of an arc of a circle, a distributed input winding extending circumferentially along said core member and adapted upon energization to produce a sufficiently high flux density in said core member to cause a stray flux to emanate radially from said core member varying in degree from the ends of said core member to a locality intermediate its ends, a second core member extending transversely of said first core member and having a portion movable along said distributed winding, and an output winding associated with said second core member and energized by the stray flux passing through said second core member.

7. An electric control device comprising an elongated core member, said core member being arranged in the form of an arc of a circle, a distributed input winding extending circumferentially along said core member and adapted upon energization to produce a sufficiently high flux density in said core member to cause a stray flux to emanate radially from said core member varying in degree from the ends of said core member to a locality intermediate its ends, a second core member associated with said first core member and having a leg extending transversely of said first core member and radially with respect thereto, said leg having a portion movable along said winding, said second core member having another leg extending axially of said first core member, means carried by said second leg for rotatably supporting said second core member, and an output winding extending about said second core member and energized by the stray flux passing through said second core member.

8. An electric control device comprising an elongated core member, said core member being arranged in the form of an arc of a circle, a distributed input winding extending circumferentially along said core member and adapted upon energization to produce a sufficiently high flux density in said core member to cause stray flux to emanate radially from said core member varying in degree from the ends of said core member to a locality intermediate its ends, a second core member associated with said first core member and having a leg extending transversely of said first core member and radially with respect thereto, said leg having a pole movable along said winding, said second named core member having another leg integral with said first leg and extending axially of said first core member, means carried by said second leg for rotatably supporting said second core member, and an output winding encircling said second leg and free therefrom to accommodate rotation of said leg within said winding, said second winding being energized by the stray flux passing through said second core member.

9. An electric control device comprising an elongated noncontinuous core member, a second elongated core member, means for supporting said members in fixed angular relation and for guiding said members for relative movement in the direction of extent of said first core member, a distributed first winding on said first core member extending along the same, a second winding on said second member, said distributed winding upon energization producing stray flux adapted to pass through the second core, said second winding being energized by the stray flux.

10. An electric control device comprising in combination, an elongated noncontinuous core member having a distributed energizing winding thereon, said distributed winding being adapted upon energization to produce a sufficiently high flux density in said core member to cause a stray flux to emanate from said core member varying in degree from the ends of said core member to a locality intermediate its length, a second core member having a portion thereof positioned adjacent said first core member and extending transversely of said first named core member, means for supporting said core members for relative movement in a direction of the extent of said first named core member, and a second winding positioned on said second named core member being energized by said stray flux.

JOHN F. SCHOEPPEL.

REFERENCES CITED

The following references are of record in the file of this patent:

UNITED STATES PATENTS

| Number | Name | Date |
|---|---|---|
| 2,097,770 | Morelisse | Nov. 2, 1937 |
| 2,143,298 | Bouke | Jan. 10, 1939 |
| 2,210,412 | Jones et al. | Aug. 6, 1940 |